United States Patent
Inoue

(10) Patent No.: US 11,961,269 B2
(45) Date of Patent: Apr. 16, 2024

(54) APPARATUS, METHOD AND NON-TRANSITORY COMPUTER-READABLE MEDIUM STORING PROGRAM FOR CONTROLLING IMAGING ENVIRONMENT OF TARGET OBJECT

(71) Applicant: NEC Corporation, Tokyo (JP)

(72) Inventor: Keiko Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 407 days.

(21) Appl. No.: 17/298,237

(22) PCT Filed: Nov. 20, 2019

(86) PCT No.: PCT/JP2019/045468
§ 371 (c)(1),
(2) Date: May 28, 2021

(87) PCT Pub. No.: WO2020/116170
PCT Pub. Date: Jun. 11, 2020

(65) Prior Publication Data
US 2022/0092866 A1   Mar. 24, 2022

(30) Foreign Application Priority Data
Dec. 5, 2018 (JP) ................................ 2018-228349

(51) Int. Cl.
*G06V 10/141* (2022.01)
*G06V 10/56* (2022.01)
(Continued)

(52) U.S. Cl.
CPC ............ *G06V 10/141* (2022.01); *G06V 10/56* (2022.01); *G06V 10/60* (2022.01); *H04N 23/74* (2023.01)

(58) Field of Classification Search
CPC ...... G06V 10/141; G06V 10/56; G06V 10/60; G06V 20/52; G06V 20/70; G06V 10/143;
(Continued)

(56) References Cited

U.S. PATENT DOCUMENTS 9,635,730 B2 * 4/2017 Baaijens ................ H05B 45/20
2003/0035061 A1 * 2/2003 Iwaki ...................... G06T 17/10
348/E5.029

(Continued)

FOREIGN PATENT DOCUMENTS

JP     H10257518 A     9/1998
JP     2000188745 A    7/2000
(Continued)

OTHER PUBLICATIONS

International Search Report of PCT Application No. PCT/JP2019/045468 dated Feb. 25, 2020.

(Continued)

*Primary Examiner* — Albert H Cutler
(74) *Attorney, Agent, or Firm* — Sughrue Mion, PLLC

(57) ABSTRACT

An information processing apparatus (2000) detects an object (30) from a captured image (20) generated by an image capture apparatus (10). The information processing apparatus (2000) determines, based on a range occupied by an image area representing the object (30) in the captured image (20), a partial range relevant to the object (30), within an output range of an output apparatus that performs an output having influence on an image capture environment. The information processing apparatus (2000) determines, based on a feature value of the image area representing the detected object (30), an output setting of the output apparatus for the partial range. The information processing apparatus (2000) applies, to the output apparatus, the output setting for the partial range determined for the object (30).

7 Claims, 8 Drawing Sheets

(51) Int. Cl.
*G06V 10/60* (2022.01)
*H04N 23/74* (2023.01)

(58) Field of Classification Search
CPC ...... G06V 10/145; H04N 23/74; H04N 23/12; H04N 23/56; H04N 5/222; H04N 23/61; G06T 1/00
USPC .................................................. 348/370, 371
See application file for complete search history.

(56) References Cited

U.S. PATENT DOCUMENTS

| | | | | |
|---|---|---|---|---|
| 2007/0177028 | A1* | 8/2007 | Kyoung | H04N 23/665 348/222.1 |
| 2010/0194291 | A1* | 8/2010 | Ishiwata | H05B 45/20 315/153 |
| 2012/0293644 | A1* | 11/2012 | Fukutake | G02B 21/365 348/79 |
| 2014/0132827 | A1* | 5/2014 | Imai | H05B 47/125 348/370 |
| 2015/0375269 | A1 | 12/2015 | Adams et al. | |
| 2016/0182797 | A1* | 6/2016 | Kervec | H04N 23/12 348/371 |
| 2017/0208237 | A1* | 7/2017 | Nagata | G03B 15/03 |

FOREIGN PATENT DOCUMENTS

| | | |
|---|---|---|
| JP | 2012247527 A | 12/2012 |
| JP | 2015186171 A | 10/2015 |
| JP | 2017518164 A | 7/2017 |

OTHER PUBLICATIONS

Kawanishi et al., "D-12-75 Region and Color Extraction for Food Product by Background Image Control", Proceedings of the IEICE general conference 2006, Information and System (2), 207, 2006, Japan.

* cited by examiner

APPARATUS, METHOD AND NON-TRANSITORY COMPUTER-READABLE MEDIUM STORING PROGRAM FOR CONTROLLING IMAGING ENVIRONMENT OF TARGET OBJECT

This application is a National Stage Entry of PCT/JP2019/045468 filed on Nov. 20, 2019, which claims priority from Japanese Patent Application 2018-228349 filed on Dec. 5, 2018, the contents of all of which are incorporated herein by reference, in their entirety.

TECHNICAL FIELD

The present invention relates to image analysis.

BACKGROUND ART

A system for recognizing a target object by using a captured image generated by a camera has been developed. Recognition of a target object by using a captured image is performed by extracting a feature of an image area representing an object from the captured image and analyzing the feature. A feature of an object is, for example, a color, an edge (contour), a surface texture, or the like.

In order that a feature of an object can be precisely extracted from a captured image, the feature of the object needs to sufficiently appear in the captured image. As one method of causing the feature of the object to sufficiently appear in the captured image, there is a method of appropriately setting an image capture environment such as illumination and a background. For example, when a white object having unevenness on a surface is strongly illuminated, the surface of the object exhibits a blown-out highlight in a captured image, and the unevenness on the surface does not appear in the captured image. Thus, extraction of a feature of the object from the captured image becomes difficult.

Examples of a prior art literature referring to appropriate setting of an image capture environment include PTL 1 and NPL 1. PTL 1 discloses a mechanism that selectively drives a plurality of illumination apparatuses and detection apparatuses in predetermined order and performs identification processing on a multimodal image combining a plurality of time-serially acquired image signals, in order to identify a plurality of features of products passing through an inspection station to separate a defective product. NPL 1 discloses a method that uses a display as a background (kitchen counter) and, while changing hue and brightness of the background around a foreground (food) within a certain range, searches for a background color making a food contour easiest to see and a background color making a food color most accurately extractable, for food recognition in a cooking assistance system.

CITATION LIST

Patent Literature

[PTL 1] Japanese Patent Application Publication No. 2017-518164

Non Patent Literature

[NPL 1] Yasutomo Kawanishi, Yoko Yamakata, Koh Kakusho, and Michihiko Minoh, "D-12-75 Region and Color Extraction for Food Product by Background Image Control", Proceedings of the IEICE general conference 2006, Information and System (2), 207, 2006

SUMMARY OF INVENTION

Technical Problem

One captured image may include a plurality of objects. In this case, a feature of each object desirably can be precisely extracted from the captured image. However, when an image capture environment is set according to a feature of any one of the objects, a feature of another object may not sufficiently appear in the captured image. PTL 1 and NPL 1 do not refer to a method by which a feature of each of a plurality of objects included in one captured image can be precisely extracted as described above.

The present invention has been made in view of the above-described problem, and one object of the present invention is to provide a technique for appropriately setting an image capture environment in such a way that a feature of each of a plurality of objects can be precisely extracted from one captured image.

Solution to Problem

An information processing apparatus according to the present invention includes: 1) a detection unit that detects an object from a captured image generated by an image capture apparatus; 2) a first determination unit that determines, based on a range occupied by an image area representing the object in the captured image, a partial range relevant to the object, within an output range of an output apparatus that performs an output having influence on an image capture environment; 3) a second determination unit that determines, based on a feature value of the image area representing the detected object, an output setting of the output apparatus for the partial range; and 4) a control unit that applies, to the output apparatus, the output setting for the partial range determined for the object.

A control method according to the present invention is executed by a computer. The control method includes: 1) a detection step of detecting an object from a captured image generated by an image capture apparatus; 2) a first determination step of determining, based on a range occupied by an image area representing the object in the captured image, a partial range relevant to the object, within an output range of an output apparatus that performs an output having influence on an image capture environment; 3) a second determination step of determining, based on a feature value of the image area representing the detected object, an output setting of the output apparatus for the partial range; and 4) a control step of applying, to the output apparatus, the output setting for the partial range determined for the object.

A program according to the present invention causes a computer to execute each of steps included in the control method according to the present invention.

Advantageous Effects of Invention

The present invention provides a technique for appropriately setting an image capture environment in such a way that a feature of each of a plurality of objects can be precisely extracted from one captured image.

EXAMPLE EMBODIMENT

Hereinafter, example embodiments of the present invention will be described by using the drawings. Note that, a similar component is assigned with a similar reference sign throughout all the drawings, and description therefor will be omitted as appropriate. Further, in each block diagram, each block represents not a configuration on a hardware basis but a configuration on a function basis, except as particularly described.

Example Embodiment 1

<Summary>

Figure 1:
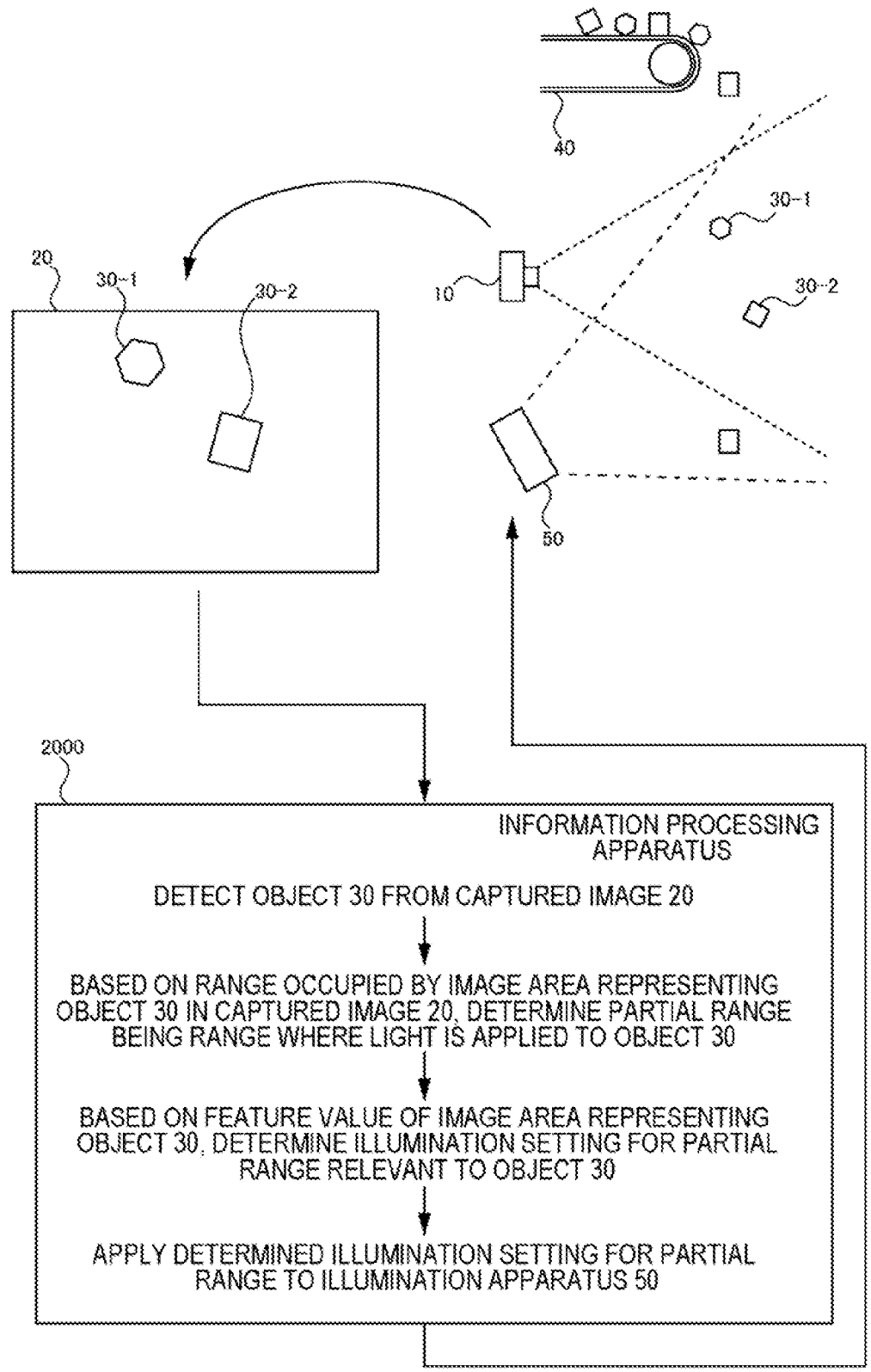
FIG. 1 is a diagram schematically illustrating an operation of an information processing apparatus according to the present example embodiment.

FIG. 1 is a diagram schematically illustrating an operation of an information processing apparatus 2000 according to the present example embodiment. Note that, FIG. 1 is illustrative for ease of understanding the information processing apparatus 2000, and a function of the information processing apparatus 2000 is not limited to the illustration in FIG. 1.

An image capture apparatus 10 performs image capturing and generates a captured image 20 as a result thereof. The information processing apparatus 2000 detects one or more objects 30 included in the captured image 20, by performing image analysis on the captured image 20. The object 30 is any object of which a position thereof changes. Note that, the object 30 may be an object (such as a vehicle) having a mechanism for changing the position, or may be an object (such as a product moved by being laid on a conveyor belt) having no mechanism for changing the position.

Herein, a feature of the object 30 that can be recognized by using the captured image 20 varies depending on an image capture environment of the object 30. The image capture environment is, for example, illumination, a background, and the like. For example, it is assumed that an image of a black object 30 having unevenness is captured with the image capture apparatus 10. In this case, when intensity of illumination is weak, an image area representing the object 30 has low contrast in the captured image 20. Thus, the unevenness of the object 30 is difficult to be recognized even by performing image analysis on the captured image 20. In contrast to this, when intensity of illumination is moderately strong, an image area representing the object 30 has high contrast in the captured image 20. Thus, the unevenness of the object 30 can be accurately recognized by performing image analysis on the captured image 20. As described above, it is necessary to appropriately set an image capture environment such as illumination, in order to precisely extract a feature of the object 30 from the captured image 20.

Further, when there are a plurality of objects 30, it is considered that an appropriate image capture environment differs by each of the objects 30. For example, when strong light necessary for recognizing a feature of the black object 30 is applied also to a white object 30, an image area representing the white object 30 exhibits a blown-out highlight in the captured image 20, and recognition of a feature of the white object 30 from the captured image 20 becomes difficult. Thus, in a case where a plurality of objects 30 are included in an image capture range of the image capture apparatus 10, when an image capture environment for the entire image capture range of the image capture apparatus 10 is determined according to one of the objects 30, extraction of a feature of another object 30 from the captured image 20 becomes difficult.

In view of the above, the information processing apparatus 2000 determines a setting of an output apparatus having influence on an image capture environment (changing an image capture environment) of the object 30, individually for a range having influence on each object 30. To do so, the information processing apparatus 2000 performs an operation as follows, for example. The information processing apparatus 2000 detects the object 30 from the captured image 20. The information processing apparatus 2000 determines, based on a range occupied by an image area (hereinafter, an object area) representing the object 30 in the captured image 20, a partial range relevant to the object 30 (having influence on an image capture environment of the object 30), within an output range of the output apparatus. Further, the information processing apparatus 2000 determines, based on a feature value of the object area, an output setting of the output apparatus for the partial range. Then, the information processing apparatus 2000 applies, to the output apparatus, the output setting determined for the partial range. Herein, when a plurality of objects 30 are detected from the captured image 20, the information processing apparatus 2000 applies, to the output apparatus, the output setting determined for each partial range determined for each of the plurality of objects 30.

Hereinafter, for easy understanding of description, an illumination apparatus (an illumination apparatus 50 in FIG. 1) that applies light is handled as the output apparatus in the present example embodiment. Another output apparatus will be described in another example embodiment.

When the output apparatus is the illumination apparatus 50, the information processing apparatus 2000 controls light output by the illumination apparatus 50, by controlling an output of the illumination apparatus 50. The light output by the illumination apparatus 50 is applied in such a way as to pass through a part or whole of the image capture range of the image capture apparatus 10. Note that, as will be described later, the light output by the illumination apparatus 50 is not limited to visible light.

The information processing apparatus 2000 determines a setting of light output by the illumination apparatus 50, individually for a range where light is applied to each object 30. To do so, the information processing apparatus 2000 performs an operation as follows, for example. The information processing apparatus 2000 determines, based on a range occupied by an object area representing the object 30 in the captured image 20, a partial range being a range where light is applied to the object 30, within a range (hereinafter, an application range) where light output from the illumination apparatus 50 is applied. Further, the information processing apparatus 2000 determines, based on a feature value of the object area, a setting (hereinafter, an illumination setting) of light applied to the partial range. Then, the information processing apparatus 2000 applies, to the illumination apparatus 50, the illumination setting determined for the determined partial range. By doing so, the light applied to the determined partial range within the light applied from the illumination apparatus 50 is light according to the determined illumination setting.

As an operation example of the information processing apparatus 2000, FIG. 1 illustrates a scene of product inspection. Specifically, a plurality of objects are conveyed by a conveyor belt 40, and subsequently fall in such a way as to pass through an inspection area (the image capture range of the image capture apparatus 10). In the example in FIG. 1, objects 30-1 and 30-2 are passing through the inspection area. Thus, the objects 30 are included in the captured image 20. The information processing apparatus 2000 determines a partial range and an illumination setting for each of the two objects 30, and applies the setting to the illumination apparatus 50.

Figure 2:
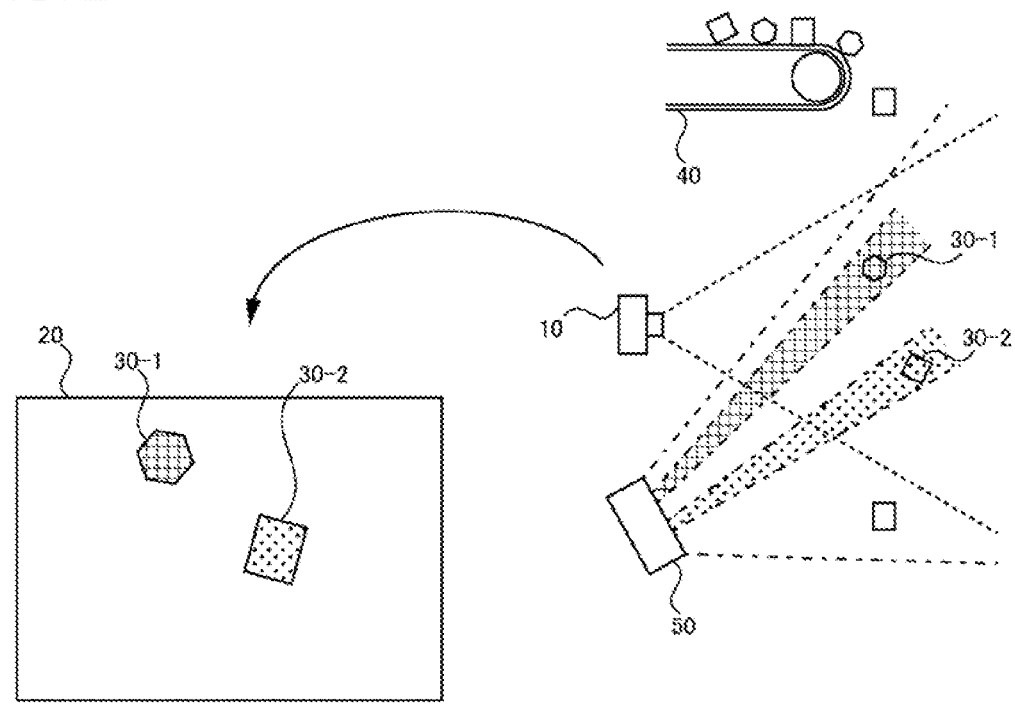
FIG. 2 is a diagram illustrating a result of modification of an illumination setting performed by the information processing apparatus.

FIG. 2 is a diagram illustrating a result of modification of an illumination setting performed by the information processing apparatus 2000. In FIG. 2, a setting of light applied to the object 30-1 and a setting of light applied to the object 30-2 are modified.

<Advantageous Effect>

According to the information processing apparatus 2000 of the present example embodiment, an output range and an output setting of an output apparatus relevant to the object 30 are determined for each of the objects 30 detected from the captured image 20. Then, the output setting determined for each partial range is applied to the output apparatus. By doing so, an image capture environment of the image capture apparatus 10 can be adjusted individually for each of a plurality of objects 30 included in an image capture range. For example, as described above, when the illumination apparatus 50 is used as the output apparatus, an illumination environment can be adjusted individually for each of the plurality of objects 30. Therefore, even when a plurality of objects 30 are included in the captured image 20, a feature of each object 30 can be precisely extracted from the captured image 20. Consequently, precision and stability in feature extraction processing can be improved.

As a usage example of the information processing apparatus 2000, for example, there is the product inspection described above. According to the information processing apparatus 2000 of the present example embodiment, in a case where a product is inspected by capturing an image of the product and performing image analysis in a factory or the like handling a wide variety of products, high-precision product inspection can be achieved, even when an image of a plurality of products is captured at once. In other words, high-precision and fast product inspection can be achieved.

As another usage example, automated separation of garbage in a garbage disposal site is conceived. Specifically, in a case where various types of garbage are image-recognized and separated in an automated way, garbage separation can be performed with high precision, even when an image of a plurality of pieces of garbage is captured at once. Thus, high-precision and fast automated separation can be achieved.

As described above, according to the information processing apparatus 2000, factory automation by means of a real-time IoT system with new additional value can be achieved. Further, the information processing apparatus 2000 can be widely used, not limitedly in the factory automation as described above, but in various fields such as robot vision, vehicle installation, security, and entertainment.

Hereinafter, further details of the present example embodiment will be described.

<Example of Function Configuration>

Figure 3:
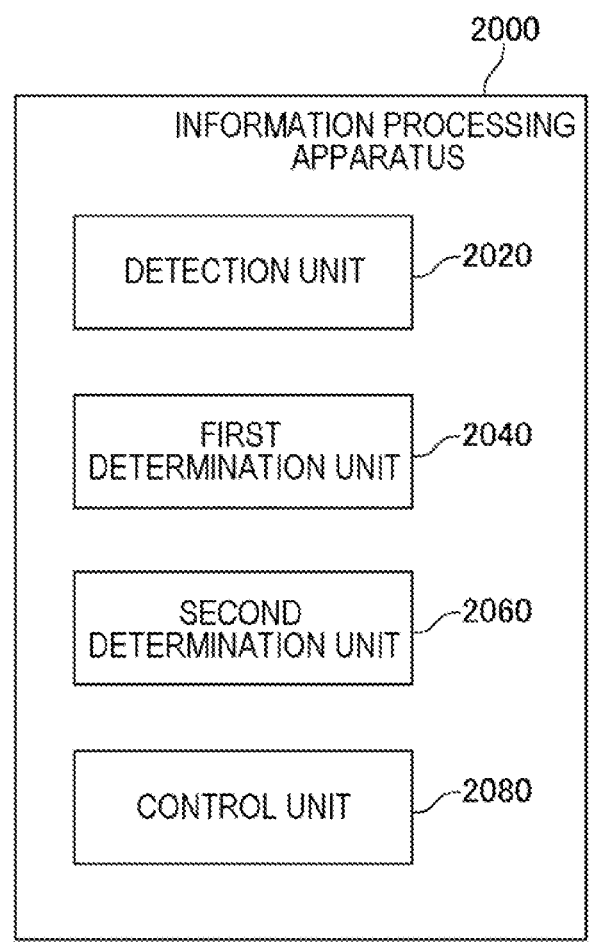
FIG. 3 is a block diagram illustrating a function configuration of the information processing apparatus.

FIG. 3 is a block diagram illustrating a function configuration of the information processing apparatus 2000. The information processing apparatus 2000 includes a detection unit 2020, a first determination unit 2040, a second determination unit 2060, and a control unit 2080. The detection unit 2020 detects the object 30 from the captured image 20. The first determination unit 2040 determines, based on a range occupied by an image area representing the object 30 in the captured image 20, a partial range relevant to the object 30, within an output range of an output apparatus that performs an output having influence on the captured image 20. The second determination unit 2060 determines, based on a feature value of the image area representing the object 30, an output setting of the output apparatus for the partial range. The control unit 2080 applies, to the output apparatus, the output setting for the partial range determined for the object 30.

Herein, when a plurality of objects 30 are detected from the captured image 20, the first determination unit 2040 determines an output range relevant to each of the plurality of objects 30. Further, the second determination unit 2060 determines an output setting relevant to each of the plurality of objects 30. Then, the control unit 2080 performs, on the output apparatus, a setting for each of the plurality of objects 30.

When the illumination apparatus 50 is handled as the output apparatus, the first determination unit 2040 determines, based on a range occupied by an image area representing the object 30 in the captured image 20, an application range of light applied to the object 30, as a partial range for the object 30, within an application range of light from the illumination apparatus 50. Further, the second determination unit 2060 determines setting of light applied to the partial range determined for the object 30, as an output setting for the partial range. Then, the control unit 2080 applies, to the illumination apparatus 50, an illumination setting for the partial range determined for the object 30.

<Example of Hardware Configuration of Information Processing Apparatus 2000>

Each of function configuration units of the information processing apparatus 2000 may be achieved by hardware (example: a hard-wired electronic circuit, or the like) achieving each of the function configuration units, or may be achieved by a combination of hardware and software (example: a combination of an electronic circuit and a program controlling the electronic circuit, or the like). Hereinafter, a case will be further described in which each of the function configuration units of the information processing apparatus 2000 is achieved by the combination of hardware and software.

Figure 4:
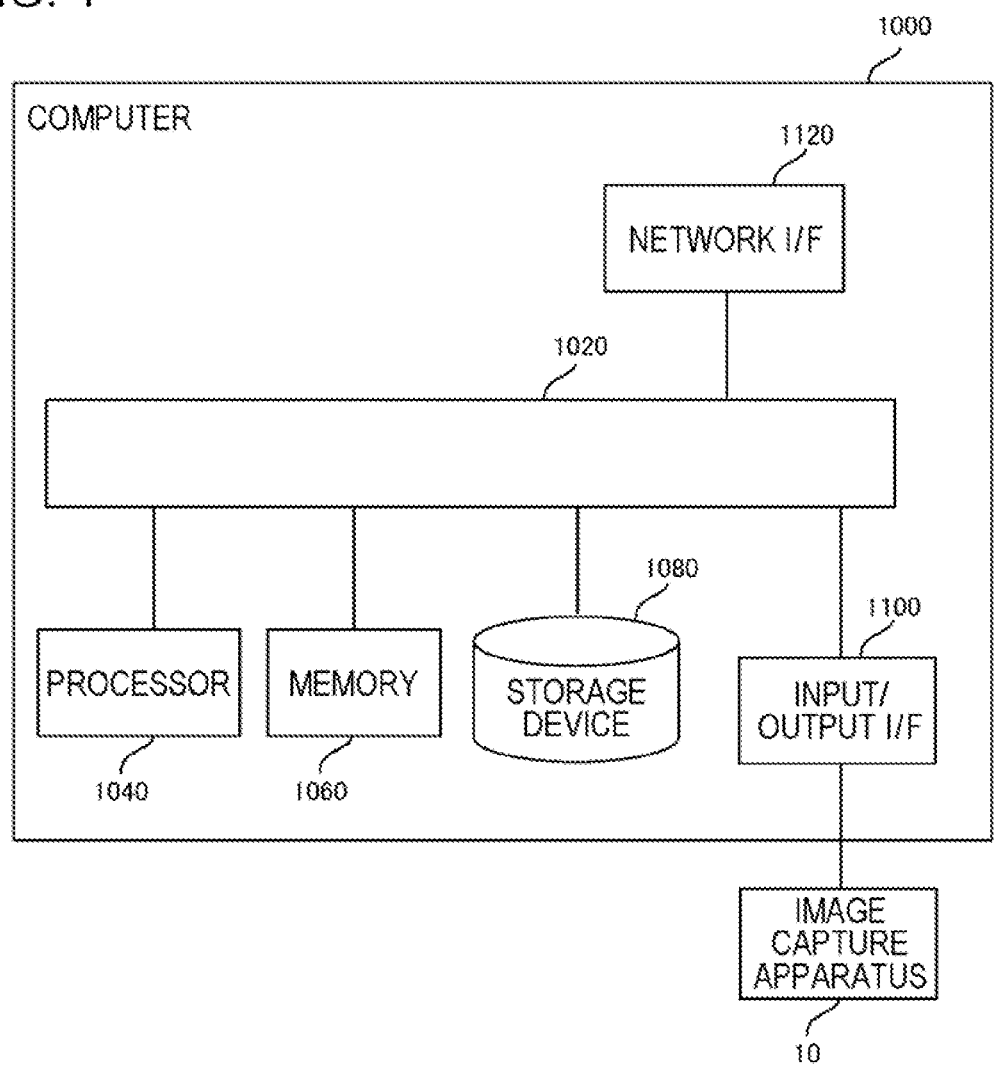
FIG. 4 is a diagram illustrating a computer for achieving the information processing apparatus.

FIG. 4 is a diagram illustrating a computer 1000 for achieving the information processing apparatus 2000. The computer 1000 is any computer. For example, the computer 1000 is a stationary computer such as a personal computer (PC) or a server machine. Besides the above, for example, the computer 1000 is a portable computer such as a smartphone or a tablet terminal. Besides the above, for example, the computer 1000 may be the image capture apparatus 10. In this case, the image capture apparatus 10 controls, by using the captured image 20 generated by the own apparatus, an output of an output apparatus having influence on an image capture environment of the own apparatus. The image capture apparatus 10 having the function of the information processing apparatus 2000 in this way is achieved by a camera called, for example, an intelligent camera, a network camera, an interne protocol (IP) camera, and the like. Note that, the computer 1000 may be a dedicated computer designed for achieving the information processing apparatus 2000, or may be a general-purpose computer.

The computer 1000 includes a bus 1020, a processor 1040, a memory 1060, a storage device 1080, an input/output interface 1100, and a network interface 1120. The bus 1020 is a data transmission line through which the processor 1040, the memory 1060, the storage device 1080, the input/output interface 1100, and the network interface 1120 transmit and receive data to and from one another. However, a method of connecting the processor 1040 and the like with one another is not limited to bus connection.

The processor 1040 is a processor of various types such as a central processing unit (CPU), a graphics processing unit (GPU), and a field-programmable gate array (FPGA). The memory 1060 is a main storage apparatus achieved by using a random access memory (RAM) or the like. The storage device 1080 is an auxiliary storage apparatus achieved by using a hard disk, a solid state drive (SSD), a memory card, a read only memory (ROM), or the like.

The input/output interface 1100 is an interface for connecting the computer 1000 with an input/output device. For example, an input apparatus such as a keyboard and an output apparatus such as a display apparatus are connected to the input/output interface 1100. Besides the above, for example, the image capture apparatus 10 is connected to the input/output interface 1100.

The network interface 1120 is an interface for connecting the computer 1000 to a communication network. The communication network is, for example, a local area network (LAN) or a wide area network (WAN). A method by which the network interface 1120 connects to the communication network may be wireless connection, or may be wired connection.

The storage device 1080 stores a program module for achieving each of the function configuration units of the information processing apparatus 2000. The processor 1040 achieves a function relevant to each program module, by reading each of the program modules into the memory 1060 and executing the program module.

<Regarding Image Capture Apparatus 10>

The image capture apparatus 10 is any apparatus that performs image capturing and generates a captured image as a result thereof. The image capture apparatus 10 may be a still camera that generates a still image, or may be a video camera that generates a moving image. Further, the image capture apparatus 10 is not limited to a visible light camera, and any apparatus can be used that generates, based on a result of detection by a sensor, data that can be handled as image data. For example, a monochromatic camera that captures an image of single-wavelength light, a camera that captures an image of infrared light or an electromagnetic wave (including a terahertz wave and a millimeter wave) in another wavelength region, and the like may be used.

A frame rate and a shutter speed of the image capture apparatus 10 are preferably set appropriately based on a size and a moving speed of the object 30 to be captured. For example, a preferred setting example of the image capture apparatus 10 in a case of capturing an image of the object 30 in free fall from a height of about 30 cm is a frame rate of 1000 fps and a shutter speed of $1/4000$.

<Regarding Illumination Apparatus 50>

The illumination apparatus 50 is an apparatus that applies light, and has a function capable of modifying a setting of light to be applied, for each part of an application range of light. For example, the illumination apparatus 50 is configured by a combination of a plurality of directional light sources that are successively driven according to a control input from the information processing apparatus 2000. Herein, for prevention of divergence in a control system, configuration is made preferably in such a way that a response speed of the illumination apparatus 50 to a control input is faster than a period in which a control input is input (that is, a period in which the information processing apparatus 2000 modifies a setting of the illumination apparatus 50).

For example, the illumination apparatus 50 is configured by a plurality of two-dimensionally array-like arranged directional point light sources of which poses can be individually changed. However, the light sources may not necessarily be arranged in an array. Further, a pose of each light source may be fixed. In this case, a mechanism (for example, a mirror) for changing a direction of light applied from a light source is provided in association with each light source, and a direction of light applied from each light source is changed by controlling a pose of each mirror.

Besides the above, for example, the illumination apparatus 50 may be configured by using a projector. In this case, light output from the projector can be changed by changing an image to be output by the projector. For example, when the projector is caused to output a grayscale image, bright light is output at a pixel closer to white, and dark light is output at a pixel closer to black.

Note that, light output from the illumination apparatus 50 is not limited to visible light. A type of light output from the illumination apparatus 50 is relevant to a type of light sensed by the image capture apparatus 10. For example, when a camera that senses visible light is used as the image capture apparatus 10, an apparatus that outputs visible light is used as the illumination apparatus 50. Besides the above, for example, when a camera that senses a near-infrared ray is used as the image capture apparatus 10, an apparatus that outputs a near-infrared ray is used as the illumination apparatus 50.

<Regarding Object 30>

The object 30 is any object of which a position thereof changes. However, the position of the object 30 may not necessarily change constantly, and, for example, moving and stopping may be repeated. The object 30 may include or may not include a mechanism for changing the position. In a former case, for example, the object 30 is a vehicle such as a car or a motorcycle, a flying body such as a drone, or the like.

In a latter case, for example, the object 30 is an object that moves while transforming own potential energy into kinetic energy, such as a free-falling object or an object going down a hill. Besides the above, for example, the object 30 may be moved by another object. For example, the another object that moves the object 30 is a conveyor belt, or an apparatus that injects gas such as air. In a former case, the object 30 is moved by being laid on the conveyor belt. In a latter case, the object 30 is moved by a force received from the injected gas.

<Flow of Processing>

Figure 5:
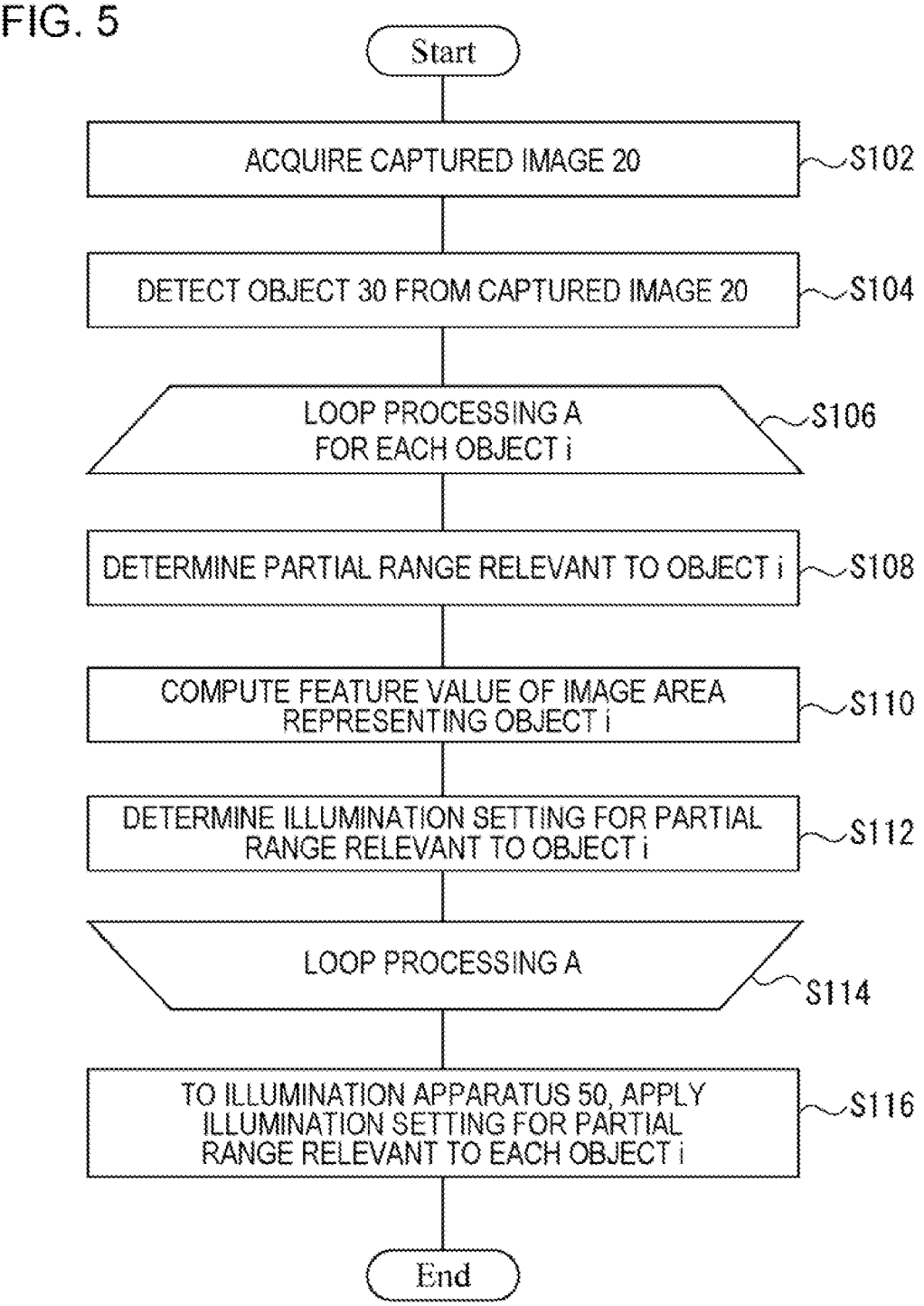
FIG. 5 is a flowchart illustrating a flow of processing executed by the information processing apparatus according to an example embodiment 1.

FIG. 5 is a flowchart illustrating a flow of processing executed by the information processing apparatus 2000 according to an example embodiment 1. The detection unit 2020 acquires the captured image 20 (S102). The detection unit 2020 detects the object 30 from the captured image 20 (S104).

S106 to S114 are loop processing A executed for each of one or more objects 30 detected from the captured image 20. In S106, the information processing apparatus 2000 determines whether the loop processing A has been executed for all of the objects 30. When the loop processing A has been already executed for all of the objects 30, the loop processing A ends. On the other hand, when there are the objects 30 not yet subjected to the loop processing A, the processing in FIG. 5 proceeds to S108. At this time, the information processing apparatus 2000 selects one of the objects 30 not yet subjected to the loop processing A. The object 30 selected herein is written as an object i.

The first determination unit 2040 determines, based on a range occupied by an image area representing the object i in the captured image 20, a partial range relevant to the object i (S108). The second determination unit 2060 computes a feature value of the image area representing the object i (S110). The second determination unit 2060 determines, based on the computed feature value, an illumination setting for the partial range relevant to the object i (S112).

Since S114 is termination of the loop processing A, the processing in FIG. 5 proceeds to S106.

After the loop processing A ends, the control unit 2080 applies, to the illumination apparatus 50, the illumination setting for the partial range determined for each object i (S116).

The information processing apparatus 2000 executes a series of processing illustrated in FIG. 5 for each of the captured images 20 generated by the image capture apparatus 10. However, the processing illustrated in FIG. 5 may be executed for only some of the captured images 20 generated by the image capture apparatus 10 rather than for all of the captured images 20. For example, the information processing apparatus 2000 executes the processing illustrated in FIG. 5 at predetermined time intervals. At this time, the detection unit 2020 acquires a latest captured image 20 generated by the image capture apparatus 10. By doing so, the processing illustrated in FIG. 5 is executed for the captured images 20 of a predetermined proportion among the captured images 20 generated by the image capture apparatus 10. The predetermined time interval described above may be set in advance in the information processing apparatus 2000, or may be stored in a storage apparatus accessible from the information processing apparatus 2000.

<Acquisition of Captured Image 20: S102>

The detection unit 2020 acquires the captured image 20 (S102). The detection unit 2020 acquires the captured image 20 in various ways. For example, the detection unit 2020 acquires the captured image 20 by receiving the captured image 20 transmitted from the image capture apparatus 10. Besides the above, for example, the detection unit 2020 accesses the image capture apparatus 10 and acquires the captured image 20 stored in the image capture apparatus 10.

Note that, the image capture apparatus 10 may store the captured image 20 in a storage apparatus provided outside the image capture apparatus 10. In this case, the detection unit 2020 accesses the storage apparatus and acquires the captured image 20.

When the function of the information processing apparatus 2000 is achieved by the image capture apparatus 10, the detection unit 2020 acquires the captured image 20 generated inside the information processing apparatus 2000. In this case, the captured image 20 is stored in, for example, a storage apparatus (for example, the storage device 1080) being inside the information processing apparatus 2000.

The detection unit 2020 acquires the captured image 20 at any timing. For example, every time a new captured image 20 is generated by the image capture apparatus 10, the detection unit 2020 acquires the newly generated captured image 20. Besides the above, for example, the detection unit 2020 may periodically acquire an unacquired captured image 20. At this time, the detection unit 2020 may acquire only a latest captured image 20, or may acquire a plurality of (for example, all) captured images 20.

<Detection of Object 30: S104>

The detection unit 2020 detects the object 30 from the captured image 20 (S104). Herein, for processing of detecting an object from a captured image, existing object detection processing (such as background subtraction) can be used.

Note that, processing of detecting a new object 30 that has not been detected from any of the captured images 20 may be performed only on a partial image area within the captured image 20. For example, when an image of an object being conveyed by a conveyor belt is captured with the image capture apparatus 10, an image area where a new object appears on the captured image 20 is limited. In view of this, such an image area where a new object appears is determined in advance, and the detection unit 2020 is caused to perform the processing of detecting the new object 30 on the image area.

For processing of detecting an already-detected object 30 from the captured image 20, an existing technique such as tracking can be used. For example, upon detecting a new object 30 from a certain captured image 20, the detection unit 2020 computes a representative point (for example, a center of gravity position) and a size of the object 30 in the captured image 20 and sets, based on the computed representative point and the size, an image area (hereinafter, a search area) searched for the object 30 in a next captured image 20. Then, upon acquiring the next captured image 20, the detection unit 2020 performs detection of the already-detected object 30 by executing object detection processing for the search area within the captured image 20.

Note that, the search area may be set in further consideration of a moving direction and a moving speed of the object 30. For example, when the object 30 is moved by being laid on a conveyor belt, the conveyor belt moves the object in a known direction at a known moving speed. Further, even when the moving speed and the moving direction are not known, the moving speed and the moving direction can be computed based on a change in a position of the object 30 detected from a plurality of captured images.

A size of the search area may be fixedly set in advance, or may be determined based on a size of the object 30 detected from the captured image 20. For example, in a latter case, a size of the search area is a constant multiple of a size of the object 30 detected from the captured image 20. In particular, when image capturing is performed at a sufficiently high frame rate such as 1000 fps, an object position hardly changes between frames, and thus, a size of the search area can be set almost as small as a size of the object 30 detected from the captured image 20. Thus, robustness against proximity of the objects 30 to each other can be improved. Further, image capturing at a high frame rate in which an object position hardly changes between frames also has an advantage of robustness against an unexpected motion of an object.

<Determination of Partial Range: S108>

The first determination unit 2040 determines, based on a range occupied by an object area of a certain object 30 in the captured image 20, a partial range relevant to the object 30 (S108). When the illumination apparatus 50 is handled as an output apparatus, the partial range relevant to the object 30 represents a range where light is applied to the object 30, within a range where light is applied by the illumination apparatus 50. Herein, the "range where light is applied to the object 30" can be acquired by, for example, transforming a search range (an area on the captured image 20) set to search for the object 30 from the next captured image 20, to an area on a coordinate system of the illumination apparatus 50.

Transformation from an area on the captured image 20 to an area on a coordinate system of the illumination apparatus 50 can be determined in advance based on setting positions or the like of the image capture apparatus 10 and the illumination apparatus 50. For example, the transformation can be determined by using a transformation equation as follows.

[Mathematical 1]

$$\begin{pmatrix} x' \\ y' \\ z' \\ 1 \end{pmatrix} = A \begin{pmatrix} x \\ y \\ z \\ 1 \end{pmatrix} = AB \begin{pmatrix} u \\ v \\ 1 \end{pmatrix} \quad (1)$$

Herein, (u,v) represents a position on the captured image 20, (x,y,z) represents a position relevant to (u,v) on a coordinate system of the image capture apparatus 10, and (x',y',z') represents a position relevant to (u,v) on a coordinate system of the illumination apparatus 50. A represents a 4×4 transformation matrix from a coordinate system of the image capture apparatus 10 to a coordinate system of the illumination apparatus 50. B represents a 4×3 transformation matrix from a position on the captured image 20 to a position on the coordinate system of the image capture apparatus 10. A and B are derived in advance based on setting positions or the like of the image capture apparatus 10 and the illumination apparatus 50.

Herein, the range where light is applied to the object 30 detected from the captured image 20 may not necessarily be set based on the search range where the object 30 is searched for from the next captured image 20. For example, the range where light is applied to the object 30 detected from the captured image 20 may be calculated by transforming an object area representing the object 30 in the captured image 20 to an area on a coordinate system of the illumination apparatus 50.

Besides the above, for example, it is assumed that, based on time required until light reflecting a setting determined by the information processing apparatus 2000 is applied from the illumination apparatus 50 and a frame rate of the image capture apparatus 10, the captured image 20 including the object 30 to which the light reflecting the setting is applied can be known as the captured image 20 x images later. In this case, the first determination unit 2040 predicts a search range for the object 30 in the captured image 20 x images later, and determines an area on a coordinate system of the illumination apparatus 50 relevant to the search range, as the partial range relevant to the object 30. For example, the search range can be predicted by presuming that the object 30 continues moving in a current moving direction at a current moving speed.

<Computation of Feature Value: S110>

The second determination unit 2060 computes a feature value of the object area (S110). For the feature value used to determine an illumination setting, various feature values can be used. For example, an index value relating to contrast of an object area, an index value relating to variation in a pixel value, an index value representing a degree of loss of information (such as a blown-out highlight and a blocked-up shadow), or the like can be used.

As the index value representing contrast of an object area, for example, Michelson contrast, Weber contrast, a contrast ratio, or the like can be used. The Michelson contrast, the Weber contrast, and the contrast ratio are defined by following expressions.

[Mathematical 2]

$$\text{Michelson Contrast}: \frac{I_{max} - I_{min}}{I_{max} + I_{min}} \quad (2)$$

$$\text{Weber Contrast}: \frac{I_{max} - I_{min}}{I_{min}} \quad (3)$$

$$\text{Contrast Ratio}: \frac{I_{max}}{I_{min} + 1} \quad (4)$$

Herein, Imax and Imin are maximum and minimum values of luminance included in an object area.

The index value relating to variation in a pixel value can be represented by dispersion of a luminance value or entropy. The dispersion of a luminance value and the entropy are represented by following expressions.

[Mathematical 3]

$$\text{Dispersion of Luminance Value}: \frac{1}{N} \sum_k (I_k - I_{avg})^2 \quad (5)$$

$$\text{Entropy}: -\sum_j \frac{N_j}{N} * \log_2 \frac{N_j}{N} \quad (6)$$

Herein, Ik is a luminance value of a pixel k included in an object area. Iavg is an average of luminance values of all pixels included in an object area. N is the total number of pixels included in an object area. Nj is the total number of pixels with gradation of j.

The index value representing a degree of loss of information is represented by, for example, the number of pixels at which a blown-out highlight is generated, or the number of pixels at which a blocked-up shadow is generated. The pixel at which a blown-out highlight is generated is the total number of pixels having a luminance value being an upper limit (for example, 255 when luminance is represented by a value from 0 to 255 inclusive) for sensor sensitivity of the image capture apparatus 10, within pixels included in an object area. The pixel at which a blocked-up shadow is generated is the total number of pixels having a luminance value being a lower limit (for example, 0 when luminance is represented by a value from 0 to 255 inclusive) for sensor sensitivity of the image capture apparatus 10, within pixels included in an object area.

<Determination of Illumination Setting: S112>

The second determination unit 2060 determines, based on the feature value of the object area representing the object 30, an illumination setting for the partial range relevant to the object 30 (S112). A specific method of determining an illumination setting based on a feature value of an object differs depending on a feature value to be used. Hereinafter, a method of determining an illumination setting will be described for each feature value to be used.

<<Index Value relating to Contrast or Index Value relating to Variation in Pixel Value>>

It is assumed that, as a feature value of an object area, an index value relating to contrast or an index value relating to variation in a pixel value is used. In this case, the second determination unit 2060 sets intensity of light applied to a partial range relevant to an object area preferably in such a way as to make the index value larger. Hereinafter, like these index values, an index value for which intensity of light is set preferably in such a way as to make the index value larger will be collectively called a first index value. Further, an object area for the object i at a time point t will be written as D(i, t), and the first index value computed for D(i,t) will be written as C(i,t).

For example, the second determination unit 2060 determines intensity T(i,t) of light applied to a partial range relevant to the object area D(i,t), based on change amount ΔC(i,t) (=C(i,t)-C(i,t-1)) of the first index value from the previous time for the object i and magnitude of modification ΔT(i,t-1) (=T(i,t-1)-T(i,t-2)) previously made to intensity of light applied to a partial range relevant to the object i.

For example, when the change amount ΔC(i,t) of the first index value is more than a predetermined threshold value Th1, the second determination unit 2060 modifies the intensity of light applied to the partial range relevant to the object area D(i,t) by using modification amount of a same sign as the previous modification amount ΔT(i,t-1). On the other hand, when the change amount ΔC(i,t) of the first index value is equal to or less than the predetermined threshold value Th1, the second determination unit 2060 modifies the intensity of light applied to the partial range relevant to the object area D(i,t) by using modification amount of an opposite sign from the previous modification amount ΔT(i,t-1). Specifically, the second determination unit 2060 determines the intensity T(i,t) of light applied to the partial range relevant to the object area D(i,t) by using following equations (7) and (8).

[Mathematical 4]

$$T(i, t) = T(i, t) + \Delta T(i, t) \quad (7)$$

$$\Delta T(i, t) = \begin{cases} -\alpha \Delta T(i, t-1) & \text{if } \Delta C(i, t) > Th_1 \\ +\beta \Delta T(i, t-1) & \text{if } \Delta C(i, t) \le Th_1 \end{cases} \quad (8)$$

Herein, both of α and β are determined in advance as any positive real number. However, both of α and β are preferably a value equal to or less than 1.

<<Index Value relating to Degree of Loss of Information>>

When an index value relating to a degree of loss of information is used as a feature value, the second determination unit 2060 sets intensity of light applied to a partial range relevant to an object area preferably in such a way as to make the index value smaller (in other words, to reduce loss of information). Hereinafter, like the index value relating to a degree of loss of information, an index value for which intensity of light is set preferably in such a way as to make the index value smaller will be called a second index value. Further, an index value representing the number of blown-out highlights in the object area D(i,t) will be written as m1(i,t), and an index value representing the number of blocked-up shadows in the object area D(i,t) will be written as m2(i,t).

The number m1(i,t) of blown-out highlights can be acquired by counting the number of pixels having a luminance value being an upper limit for sensor sensitivity of the image capture apparatus 10, within pixels included in the object area D(i,t). When m1(i,t) is used, the second determination unit 2060 determines whether m1(i,t) is equal to or less than a threshold value Th2. When m1(i,t)≤Th2, the second determination unit 2060 does not modify the intensity of light applied to the partial range relevant to the object area D(i,t). On the other hand, when m1(i,t)>Th2, the second determination unit 2060 sets modification amount ΔT(i,t) of the intensity of light applied to the partial range relevant to the object area D(i,t), to a predetermined negative value −ΔT0 (ΔT0>0).

[Mathematical 5]

$$\Delta T(i, t) = \begin{cases} -\Delta T_0 & \text{if } m_1(i, t) > Th_2 \\ 0 & \text{if } m_1(i, t) \le Th_2 \end{cases} \quad (9)$$

The number m2(i,t) of blocked-up shadows can be acquired by counting the number of pixels having a luminance value being a lower limit (for example, 0 when luminance is represented by a value from 0 to 255 inclusive) for sensor sensitivity of the image capture apparatus 10, within pixels included in the object area D(i,t). When m2(i,t) is used, the second determination unit 2060 determines whether m2(i,t) is equal to or less than the threshold value Th2. When m2(i,t)≤Th2, the second determination unit 2060 does not modify the intensity of light applied to the partial range relevant to the object area D(i,t). On the other hand, when m2(i,t)>Th2, the second determination unit 2060 sets modification amount ΔT(i,t) of the intensity of light applied to the partial range relevant to the object area D(i,t), to a predetermined positive value +ΔT0. In other words, the second determination unit 2060 determines ΔT(i,t) by using the above-described equation (9) and a following equation (10).

[Mathematical 6]

$$\Delta T(i, t) = \begin{cases} +\Delta T_0 & \text{if } m_2(i, t) \ge Th_2 \\ 0 & \text{if } m_2(i, t) < Th_2 \end{cases} \quad (10)$$

Herein, the threshold value relating to m1(i,t) and the threshold value relating to m2(i,t) may be mutually different values. Further, an absolute value of modification amount added to intensity of light when m1(i,t) is equal to or more than the threshold value and an absolute value of modification amount added to intensity of light when m2(i,t) is equal to or more than the threshold value may also be mutually different values.

Note that, both of m1 and m2 may be used. It is assumed, in this case, that both of m1(i,t) and m2(i,t) are equal to or more than the threshold value. In this case, the second determination unit 2060 sets the intensity of light applied to the partial range relevant to the object area D(i,t) in such a way as to equalize quantity of blown-out highlights and quantity of blocked-up shadows. Specifically, the second determination unit 2060 decreases the intensity of light (for example, adds modification of ΔT0) when m1(i,t)>m2(i,t), increases the intensity of light (for example, adds modification of +ΔT0) when m1(i,t)<m2(i,t), and does not modify the intensity of light when m1(i,t)=m2(i,t). In this way, blown-out highlights and blocked-up shadows are balanced.
<<Combination Use of First Index Value and Second Index Value>>

The second determination unit 2060 may use the first index value and the second index value in combination. For example, the second determination unit 2060 determines (the equation (9) or (10)) modification amount ΔT(i,t) of the intensity of light applied to the partial range relevant to the object area D(i,t), based on the second index value when the second index value is equal to or more than a threshold value, and determines (the equation (8)) ΔT(i,t), based on the first index value when the second index value is less than the threshold value.

As a specific example, it is assumed that the number m1(i,t) of blown-out highlights is used as the second index value. In this case, the second determination unit 2060 first determines whether m1(i,t) is equal to or more than the threshold value Th2. When m1(i,t)≥Th2, the second determination unit 2060 sets −ΔT0 for ΔT(i,t). On the other hand, when m1(i,t)<Th2, the second determination unit 2060 determines ΔT(i,t), based on comparison between ΔC(i,t) and the threshold value Th1. In other words, the second determination unit 2060 determines amount ΔT(i,t), based on a following equation (11).

[Mathematical 7]

$$\Delta T(i, t) = \begin{cases} -\Delta T_0 & \text{if } m_1(i, t) > Th_2 \\ -\alpha \Delta T(i, t-1) & \text{if } m_1(i, t) \le Th_2 \text{ and } \Delta C(i, t) > Th_1 \\ +\beta \Delta T(i, t-1) & \text{if } m_1(i, t) \le Th_2 \text{ and } \Delta C(i, t) \le Th_1 \end{cases} \quad (11)$$

Note that, for intensity of light applied to a range where the object 30 is not detected, any value may be set. For example, intensity of light set in this case is set to a maximum value of intensity of light that can be applied from the illumination apparatus 50. By doing so, when a new object appears in the range, the object can be easily detected from the captured image 20. Further, similarly, also for intensity of light applied to a partial range determined for the object 30 when the object 30 is first detected, any intensity such as the maximum value of intensity of light that can be applied from the illumination apparatus 50 may be set.
<Application of Setting: S116>

The control unit 2080 applies, to the illumination apparatus 50, the illumination setting for the partial range determined for each object 30 (S116). Specifically, the control unit 2080 performs control in such a way that, for each of a plurality of objects 30 detected from the captured image 20, light according to the illumination setting determined for the object 30 is applied to the partial range determined for the object 30. A specific control method thereof depends on a configuration of the illumination apparatus 50.

For example, it is assumed that the illumination apparatus 50 has a configuration in which a plurality of point light sources are arranged. In this case, the control unit 2080 determines one or more point light sources relevant to the partial range determined for the object 30, and applies the illumination setting determined for the object 30 to a setting of light applied from the point light sources. For example, the control unit 2080 sets intensity of light applied from a point light source in a determined range to the intensity of light determined by the second determination unit 2060.

Note that, for a technique for setting intensity of light of a point light source to desired intensity, an existing technique can be used. The above-described setting is executed for each of the objects 30 detected from the captured image 20.

Besides the above, for example, it is assumed that the illumination apparatus 50 is achieved by a projector. In this case, the control unit 2080 generates an image (hereinafter, an illumination image) output to the projector, based on the partial range and the illumination setting determined for each object 30. The illumination image is, for example, a grayscale image. More specifically, the control unit 2080 determines, from the previous illumination image output to the projector, an image area relevant to the partial range determined for the object 30, and determines a color of a pixel in the determined image area, based on the illumination setting determined for the object 30. For example, when the illumination image is a grayscale image, the closer to white a color of a pixel is, the stronger light applied from the projector, based on the pixel, is. In view of this, for example, the control unit 2080 uses the intensity of light determined by the second determination unit 2060, as a value of a pixel in the illumination image. The above-described setting is executed for each of the objects 30 detected from the captured image 20.

Example Embodiment 2

Figure 6:
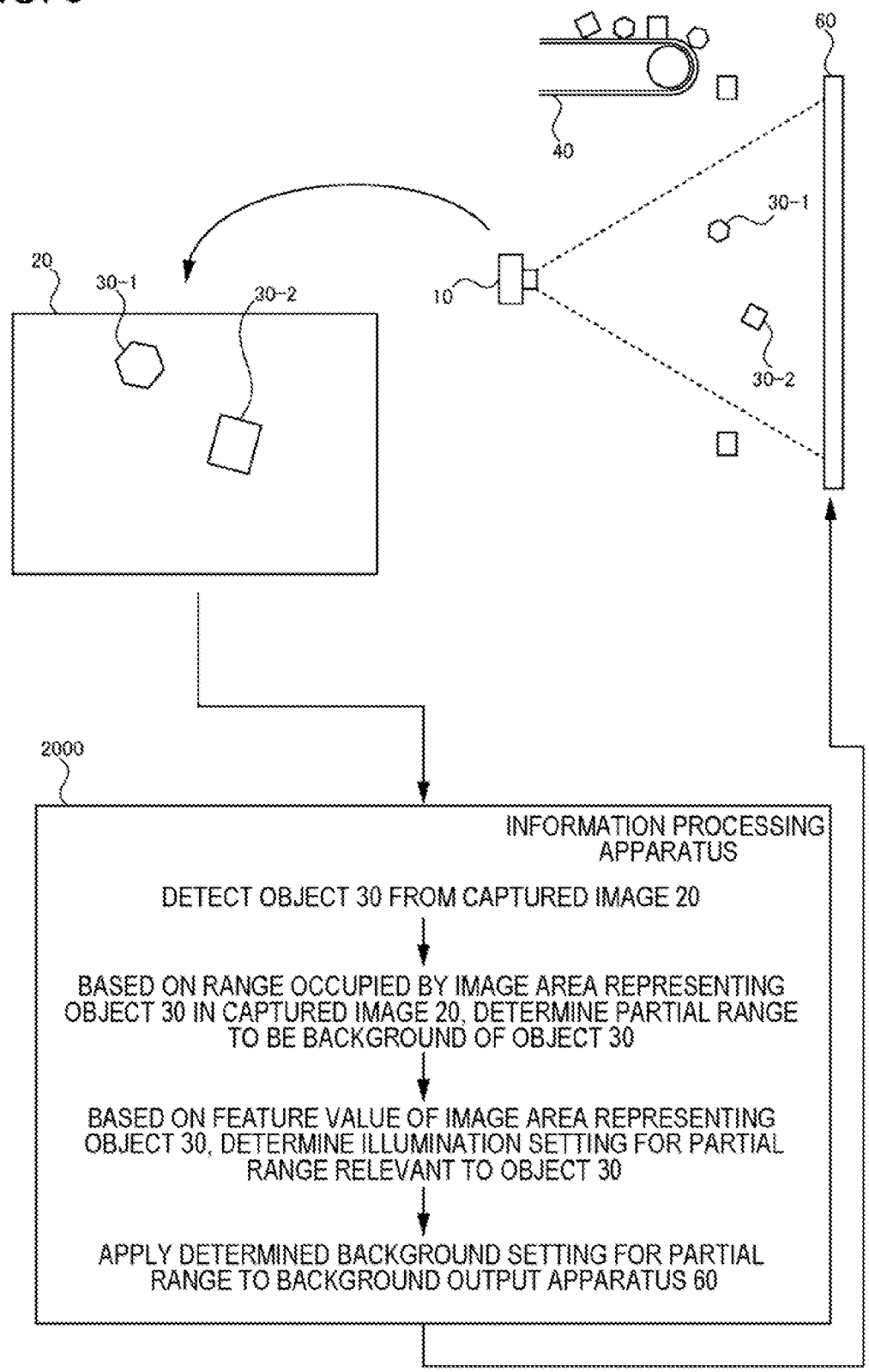
FIG. 6 is a diagram schematically illustrating an operation of an information processing apparatus according to an example embodiment 2.

FIG. 6 is a diagram schematically illustrating an operation of an information processing apparatus according to an example embodiment 2. An information processing apparatus 2000 according to the example embodiment 2 handles, as an output apparatus, an apparatus (hereinafter, a background output apparatus 60) that outputs a background of an object 30. For example, the background output apparatus 60 is a display apparatus that can display any image. When the object 30 is positioned between an image capture apparatus 10 and the display apparatus, an image displayed on the display apparatus becomes a background of the object 30 in a captured image 20. Besides the above, for example, the background output apparatus 60 may be a projector or the like that applies light to a projection plane (such as a wall or a screen) behind the object 30 when seen from the image capture apparatus 10.

Herein, when the object 30 has a color similar to the background, extraction of a feature of the object 30 from the captured image 20 is difficult. For example, it is assumed that the object 30 is a black object having unevenness and the background has a dark gray color close to black. In this case, a color difference between the object 30 and the background is small in the captured image 20, and recognition of the unevenness of the object 30 is difficult. On the other hand, when the background of the object 30 is white, a color difference between the object 30 and the background is large in the captured image 20, and it can be said that the unevenness of the object 30 can be precisely recognized. Thus, the background preferably has a color having a large difference from a color of the object 30.

In view of the above, the information processing apparatus 2000 determines, based on a range occupied by an image area (that is, an object area) representing the object 30 in the captured image 20, a range of and around the object 30, as a partial range for performing a setting of a background, within a range of a background output by the background output apparatus 60. Further, the information processing apparatus 2000 determines, for the partial range, a setting (hereinafter, a background setting) of the background output by the background output apparatus 60. The background setting for the partial range is determined based on a feature value computed for the image area representing the object 30. Then, the information processing apparatus 2000 applies, to the background output apparatus 60, the determined background setting for the partial range.

As an operation example of the information processing apparatus 2000, FIG. 6 illustrates a scene of product inspection similar to FIG. 1. The information processing apparatus 2000 determines a partial range to be a background and a background setting for each of the objects 30-1 and 30-2, and applies the setting to the background output apparatus 60.

Figure 7:
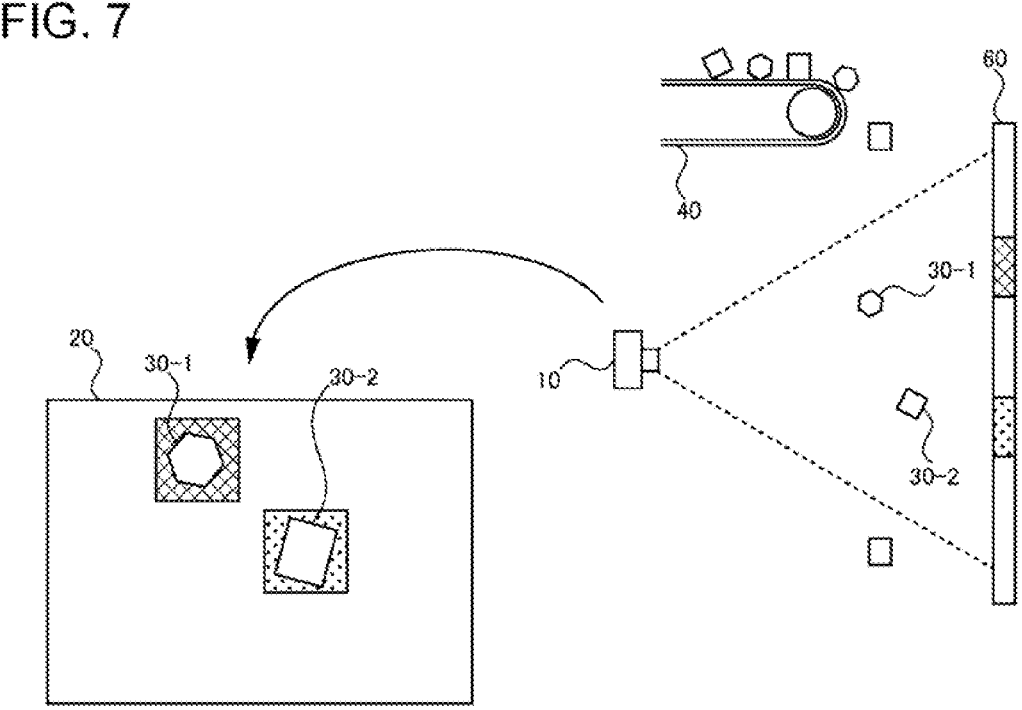
FIG. 7 is a diagram illustrating a result of modification of a background setting performed by the information processing apparatus.

FIG. 7 is a diagram illustrating a result of modification of a background setting performed by the information processing apparatus 2000. In FIG. 7, a setting of a background around an object 30-1 and a setting of a background around an object 30-2 are modified.

<Advantageous Effect>

According to the information processing apparatus 2000 of the present example embodiment, a range (a partial range) and a background setting of a background relevant to the object 30 are determined for each of the objects 30 detected from the captured image 20. Then, the background setting determined for each partial range is applied to the background output apparatus 60. By doing so, a background of the object 30 of the image capture apparatus 10 can be adjusted individually for each of a plurality of objects 30 included in an image capture range. Therefore, even when a plurality of objects 30 are included in the captured image 20, a feature of each object 30 can be precisely extracted from the captured image 20. Consequently, precision and stability in feature extraction processing can be improved.

Hereinafter, the information processing apparatus 2000 according to the present example embodiment will be described in further detail.

<Regarding Function Configuration>

A function configuration of the information processing apparatus 2000 according to the example embodiment 2 is represented in, for example, FIG. 3, similarly to the information processing apparatus 2000 according to the example embodiment 1. However, a partial range determined for the object 30 by a first determination unit 2040 according to the example embodiment 2 is a range to be a background of and around the object 30, within a range of a background output by the background output apparatus 60. Further, a second determination unit 2060 according to the example embodiment 2 determines a background setting output to the determined partial range mentioned above. Then, a control unit 2080 according to the example embodiment 2 applies, to the background output apparatus 60, the background setting for the determined partial range.

<Example of Hardware Configuration>

A hardware configuration of the information processing apparatus 2000 according to the example embodiment 2 is represented in, for example, FIG. 4, similarly to the hardware configuration of the information processing apparatus 2000 according to the example embodiment 1. However, a storage device 1080 constituting the information processing apparatus 2000 according to the example embodiment 2 stores each program module for achieving a function of the information processing apparatus 2000 according to the example embodiment 2.

<Flow of Processing>

Figure 8:
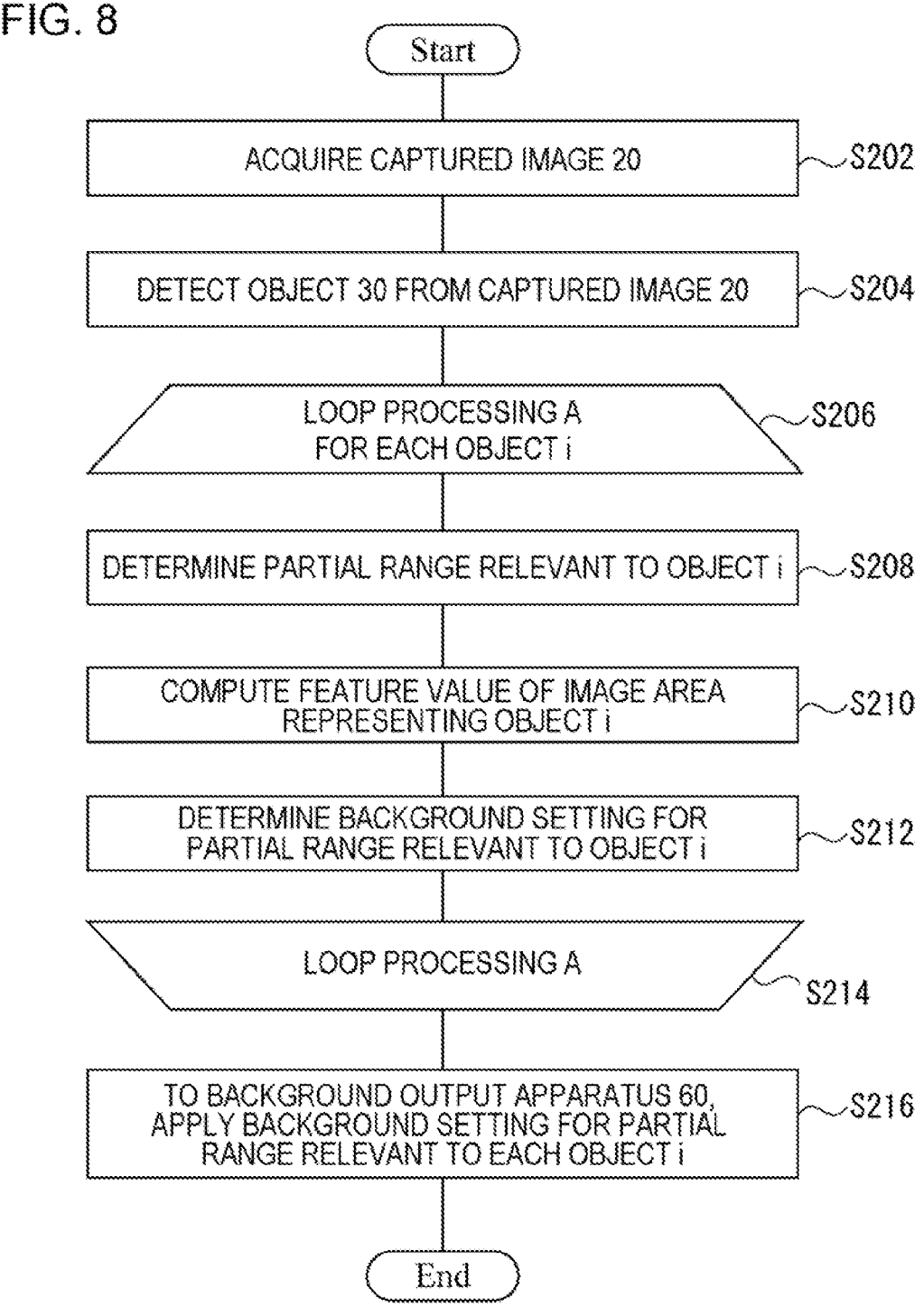
FIG. 8 is a flowchart illustrating a flow of processing executed by the information processing apparatus according to the example embodiment 2.

FIG. 8 is a flowchart illustrating a flow of processing executed by the information processing apparatus 2000 according to the example embodiment 2. The flow of processing illustrated by the flowchart in FIG. 8 is similar to the flow of processing illustrated by the flowchart in FIG. 5.

<Determination of Partial Range: S208>

The first determination unit 2040 determines, based on a range occupied by an object area of a certain object 30 in the captured image 20, a partial range relevant to the object 30 (S208). When the background output apparatus 60 is handled as an output apparatus, the partial range relevant to the object 30 represents a range where a background around the object 30 is output, within a range where a background is output by the background output apparatus 60.

The partial range for the background output apparatus 60 can be determined in a way similar to the partial range for the illumination apparatus 50. For example, the partial range for the background output apparatus 60 can be acquired by transforming a search range (an area on the captured image 20) set to search for the object 30 from the next captured image 20, to an area on a coordinate system of the background output apparatus 60.

Transformation from an area on the captured image 20 to an area on a coordinate system of the background output apparatus 60 can be determined in advance based on setting positions or the like of the image capture apparatus 10 and the background output apparatus 60. For example, the transformation can be determined by using a transformation equation as follows.

[Mathematical 8]

$$\begin{pmatrix} x' \\ y' \\ z' \\ 1 \end{pmatrix} = C \begin{pmatrix} x \\ y \\ z \\ 1 \end{pmatrix} = CB \begin{pmatrix} u \\ v \\ 1 \end{pmatrix} \quad (12)$$

Herein, (u,v) represents a position on the captured image 20, and (x,y,z) represents a position relevant to (u,v) on a coordinate system of the image capture apparatus 10. These are similar to the equation (1). (x',y',z') represents a position relevant to (u,v) on a coordinate system of the background output apparatus 60. C represents a 4×4 transformation matrix from a coordinate system of the image capture apparatus 10 to a coordinate system of the background output apparatus 60. B represents a 4×3 transformation matrix from a position on the captured image 20 to a position on the coordinate system of the image capture apparatus 10, similarly to the equation (1). B and C are derived in advance based on setting positions or the like of the image capture apparatus 10 and the background output apparatus 60.

Note that, it is sufficient that the partial range for the illumination apparatus 50 includes only the relevant object 30, whereas the partial range for the background output apparatus 60 preferably includes not only the relevant object 30 but also the periphery thereof. Thus, when the above-described search range is set to a size substantially identical with a size of an object area representing the object 30, the partial range for the background output apparatus 60 is preferably wider than the search range. In view of this, for example, the first determination unit 2040 may compute an image area having a size predetermined times larger than a size of the search range, the predetermined times being more than one time, and may determine, as the partial range, a range acquired by transforming the image area to an area on the background output apparatus 60.

<Computation of Feature Value: S210>

The second determination unit 2060 computes a feature value of the object area being an image area representing the object 30 (S210). For example, a feature value relating to a color of the object area is computed. For example, the second determination unit 2060 computes, as the feature value of the object area, a representative point on a color space (for example, an HSV space) representing a feature of the object area. For example, the representative point is a point (Hobj, Sobj, Vobj) determined by a representative value Hobj of hue, a representative value Sobj of saturation, and a representative value Vobj of brightness of a partial area. Herein, the representative values of hue and the like are statistics such as an average and a most frequent value of hue and the like for each pixel.

Note that, the second determination unit 2060 may compute a plurality of feature values of the object area. For example, the second determination unit 2060 computes a plurality of representative points on the color space representing a feature of the object area, and determines a set of the representative points as feature values of the object area. Specifically, when color distribution of pixels included in the object area is scattered into a plurality of areas on the color space, the second determination unit 2060 computes a representative point for each of the plurality of areas, and determines a set of the plurality of computed representative points as feature values of the object area. Herein, for a method of separating points scattered on a space into a plurality of areas, for example, a clustering approach such as k-means clustering can be used.

<Determination of Background Setting: S212>

The second determination unit 2060 determines, by using the feature value computed for the object area representing the object 30, a background setting for the partial range determined for the object 30 (S212). For example, the second determination unit 2060 determines, for the representative point on the color space computed as the feature value of the object area, a point (for example, a farthest point) sufficiently far from the representative point, and determines a color represented by the point as a background color of the partial range relevant to the object area.

Note that, the background color may be determined by focusing on not all elements on the color space but only some of the elements. As an example, it is assumed that the focus is on hue. In this case, the second determination unit 2060 computes the representative value Hobj of hue. Then, for example, the second determination unit 2060 sets a hue Hb of the background color to Hobj+180° or Hobj−180°. Saturation and brightness of the background color may be any value. For example, the second determination unit 2060 sets the background color to a color represented as (Hobj±180°, Smax, Vmax) using HSV representation. Herein, Smax represents a maximum value of saturation and Vmax represents a maximum value of brightness.

Note that, a value added to or subtracted from Hobj may not necessarily be 180°, and may be a value that can make a hue of the object area and a hue of the background far from each other on a hue circle (on the color space) to a such degree that the object area and the background can be easily separated. For example, when the captured image 20 is binarized based on hue, binarization may be performed in such a way that Hobj and Hb are mutually different values. For example, it is assumed that binarization is performed in such a way that a value for a range of Hobj±90° differs from a value for another range. In this case, Hb may be computed by adding or subtracting, to or from Hobj, a value larger than 90° and smaller than 270°. However, since it is considered that the object area and the background can be separated more easily when the object area and the background are largely spaced apart from each other on the hue circle, a value added to or subtracted from Hobj is preferably 180° or a value close to 180°.

Herein, when a plurality of representative points are computed as feature values of the object area, the second determination unit 2060 determines a background color, based on the plurality of representative points. For example, the second determination unit 2060 determines a point on the color space at which a sum of distances from the representative points is maximum, and determines a color represented by the point as a background color.

<<Adjustment of Background Color in consideration of Characteristics of Image Capture Apparatus 10 and Background Output Apparatus 60>>

Herein, due to a light-receiving characteristic of the image capture apparatus 10 and a color-developing characteristic of the background output apparatus 60, a background color output by the background output apparatus 60 may be different from a background color in the captured image 20 acquired by capturing the background color with the image capture apparatus 10. In view of this, the second determination unit 2060 may adjust a background color to be output by the background output apparatus 60 in such a way that a color appearing on the captured image 20 becomes a background color determined by the above-described method. In other words, the second determination unit 2060 determines a color acquired by further applying predetermined transformation to a background color determined by the above-described method, as a background color set for the background output apparatus 60.

The above-described transformation can be achieved by, for example, an affine transformation on the color space indicated below.

[Mathematical 9]

$$a_{back} = R a_{img} + t \qquad (13)$$

Herein, $a_{back}$ represents a background color set for the background output apparatus 60, and $a_{img}$ represents a background color appearing on the captured image 20. R and t represent a rotational component and a translational component of the affine transformation on the color space, respectively.

For example, the second determination unit 2060 substitutes the above-described color represented as (Hobj±180°, Smax, Vmax) for $a_{img}$ in the equation (13), and determines acquired $a_{back}$ as a background color set for the background output apparatus 60.

The above-described transformation equation is determined in advance. For example, the transformation equation in an equation (13) can be determined by outputting various colors from the background output apparatus 60, capturing the various colors with the image capture apparatus 10, and using each combination of a color appearing on the captured image 20 and a color output from the background output apparatus 60.

<Application of Setting: S216>

The control unit 2080 applies, to the background output apparatus 60, the background setting for the partial range determined for each object 30 (S216). Specifically, for each of a plurality of objects 30 detected from the captured image 20, the control unit 2080 performs control in such a way that a background according to the background setting determined for the object 30 is output to the partial range determined for the object 30. A specific control method thereof depends on a configuration of the background output apparatus 60.

For example, it is assumed that the background output apparatus 60 is configured by a display apparatus or a projector. In this case, the control unit 2080 generates an image (hereinafter, a background image) output to the background output apparatus 60, based on the partial range and the background setting determined for each object 30. More specifically, the control unit 2080 determines, from the previous background image, an image area relevant to the partial range determined for the object 30, and sets a color of a pixel in the determined image area, to a background color determined for the object 30. The setting is executed for each of the objects 30 detected from the captured image 20.

While the example embodiments of the present invention have been described with reference to the drawings, the above-described example embodiments are illustrative of the present invention, and a combination of the above-described example embodiments or various configurations other than the above may be employed.

The whole or part of the above-described example embodiments can be described as, but not limited to, the following supplementary notes.

1. An information processing apparatus including:
   a detection unit that detects an object from a captured image generated by an image capture apparatus;
   a first determination unit that determines, based on a range occupied by an image area representing the object in the captured image, a partial range relevant to the object, within an output range of an output apparatus that performs an output having influence on an image capture environment;
   a second determination unit that determines, based on a feature value of the image area representing the detected object, an output setting of the output apparatus for the partial range; and
   a control unit that applies, to the output apparatus, the output setting for the partial range determined for the object.

2. The information processing apparatus according to supplementary note 1, wherein
   the first determination unit determines the output range relevant to each of a plurality of the objects detected from the captured image,
   the second determination unit determines the output setting relevant to each of a plurality of the objects, and
   the control unit performs, on the output apparatus, a setting for each of a plurality of the objects.

3. The information processing apparatus according to supplementary note 1 or 2, wherein
   the output apparatus is an illumination apparatus,
   the partial range determined for the object is an application range of light applied to the object, within an application range of light from the illumination apparatus, and
   the output setting determined for the object is a setting of light applied to the partial range determined for the object.

4. The information processing apparatus according to supplementary note 1, wherein
   the second determination unit
      computes, as a feature value of the image area representing the object, an index value representing contrast of the image area or variation in a pixel value of the image area, and
      determines, by using the computed index value, intensity of light applied to the partial range determined for the object, to intensity that makes the index value of the image area representing the object larger.

5. The information processing apparatus according to supplementary note 4, wherein
   the second determination unit
      computes a difference between the index value computed for the object included in the certain captured image and the index value computed for the object included in a captured image generated earlier than the captured image,
      adds, when the computed difference is more than a threshold value, a modification value of an opposite sign from the previous modification value to intensity of light applied to the partial range determined for the object, and
      adds, when the computed difference is equal to or less than a threshold value, a modification value of a same sign as the previous modification value to intensity of light applied to the partial range determined for the object.

6. The information processing apparatus according to any one of supplementary notes 3 to 5, wherein
   the second determination unit, in the image area representing the object,
      modifies, when a predetermined number or more of pixels have luminance equal to or more than a first threshold value, intensity of light applied to the partial range determined for the object to a smaller value, and
      modifies, when a predetermined number or more of pixels have luminance equal to or less than a second threshold value, intensity of light applied to the partial range determined for the object to a larger value.

7. The information processing apparatus according to supplementary note 1 or 2, wherein
   the output apparatus is an apparatus that outputs a background,
   the partial range determined for the object is a range to be a background of and around the object, within a range of the background output by the output apparatus, and
   the output setting determined for the object is a setting of a color of a background output to the partial range determined for the object.

8. The information processing apparatus according to supplementary note 7, wherein
   the second determination unit
      computes, as a feature value of the image area representing the object, a representative point on a color space relating to a color of the image area,
      determines a point satisfying a predetermined relation with the representative point on the color space, and
      determines, based on a color relevant to the determined point, a color of a background of the partial range determined for the object.

9. The information processing apparatus according to supplementary note 8, wherein
the second determination unit
computes, as a feature value of the image area representing the object, a representative value of hue of the image area,
determines a color far from the computed representative value by a predetermined angle on a hue circle, and
determines, based on the determined color, a color of a background of the partial range determined for the object.
10. The information processing apparatus according to any one of supplementary notes 1 to 9, wherein the first determination unit transforms, by using information representing correspondence between a position on the image capture apparatus and an output position of the output apparatus, a range on the captured image indicated by the image area representing the object to an output range of the output apparatus.
11. A control method executed by a computer, including:
a detection step of detecting an object from a captured image generated by an image capture apparatus;
a first determination step of determining, based on a range occupied by an image area representing the object in the captured image, a partial range relevant to the object, within an output range of an output apparatus that performs an output having influence on an image capture environment;
a second determination step of determining, based on a feature value of the image area representing the detected object, an output setting of the output apparatus for the partial range; and
a control step of applying, to the output apparatus, the output setting for the partial range determined for the object.
12. The control method according to supplementary note 11, further including:
in the first determination step, determining the output range relevant to each of a plurality of the objects detected from the captured image;
in the second determination step, determining the output setting relevant to each of a plurality of the objects; and
in the control step, performing, on the output apparatus, a setting for each of a plurality of the objects.
13. The control method according to supplementary note 11 or 12, wherein
the output apparatus is an illumination apparatus,
the partial range determined for the object is an application range of light applied to the object, within an application range of light from the illumination apparatus, and
the output setting determined for the object is a setting of light applied to the partial range determined for the object.
14. The control method according to supplementary note 11, further including:
in the second determination step,
computing, as a feature value of the image area representing the object, an index value representing contrast of the image area or variation in a pixel value of the image area; and
determining, by using the computed index value, intensity of light applied to the partial range determined for the object, to intensity that makes the index value of the image area representing the object larger.
15. The control method according to supplementary note 14, further including:
in the second determination step,
computing a difference between the index value computed for the object included in the certain captured image and the index value computed for the object included in a captured image generated earlier than the captured image;
adding, when the computed difference is more than a threshold value, a modification value of an opposite sign from the previous modification value to intensity of light applied to the partial range determined for the object; and
adding, when the computed difference is equal to or less than a threshold value, a modification value of a same sign as the previous modification value to intensity of light applied to the partial range determined for the object.
16. The control method according to any one of supplementary notes 13 to 15, further including:
in the second determination step, in the image area representing the object,
modifying, when a predetermined number or more of pixels have luminance equal to or more than a first threshold value, intensity of light applied to the partial range determined for the object to a smaller value; and
modifying, when a predetermined number or more of pixels have luminance equal to or less than a second threshold value, intensity of light applied to the partial range determined for the object to a larger value.
17. The control method according to supplementary note 11 or 12, wherein
the output apparatus is an apparatus that outputs a background,
the partial range determined for the object is a range to be a background of and around the object, within a range of the background output by the output apparatus, and
the output setting determined for the object is a setting of a color of a background output to the partial range determined for the object.
18. The control method according to supplementary note 17, further including:
in the second determination step,
computing, as a feature value of the image area representing the object, a representative point on a color space relating to a color of the image area;
determining a point satisfying a predetermined relation with the representative point on the color space; and
determining, based on a color relevant to the determined point, a color of a background of the partial range determined for the object.
19. The control method according to supplementary note 18, further including:
in the second determination step,
computing, as a feature value of the image area representing the object, a representative value of hue of the image area;
determining a color far from the computed representative value by a predetermined angle on a hue circle; and determining, based on the determined color, a color of a background of the partial range determined for the object.

20. The control method according to any one of supplementary notes 11 to 19, further including, in the first determination step, transforming, by using information representing correspondence between a position on the image capture apparatus and an output position of the output apparatus, a range on the captured image indicated by the image area representing the object to an output range of the output apparatus.

21. A program that causes a computer to execute each of steps included in the control method according to any one of supplementary notes 11 to 20.

This application is based upon and claims the benefit of priority from Japanese patent application No. 2018-228349, filed on Dec. 5, 2018, the disclosure of which is incorporated herein in its entirety by reference.

REFERENCE SIGNS LIST 10 image capture apparatus
20 Captured image
30 Object
40 Conveyor belt
50 Illumination apparatus
60 Background output apparatus
1000 Computer
1020 Bus
1040 Processor
1060 Memory
1080 Storage device
1100 Input/output interface
1120 Network interface
2000 Information processing apparatus
2020 Detection unit
2040 First determination unit
2060 Second determination unit
2080 Control unit

What is claimed is:

1. An information processing apparatus comprising:
at least one memory configured to store instructions; and
at least one processor configured to execute the instructions to perform operations comprising:
detecting an object from a captured image generated by an image capture apparatus;
determining, based on a range occupied by an image area representing the object in the captured image, a partial range relevant to the object, within an output range of an output apparatus that performs an output having influence on an image capture environment;
determining, based on a feature value of the image area representing the detected object, an output setting of the output apparatus for the partial range; and
applying, to the output apparatus, the output setting for the partial range determined for the object, wherein
the output apparatus is an apparatus that outputs a background,
the partial range determined for the object is a range to be a background of and around the object, within a range of a background output by the output apparatus, and
the output setting determined for the object is a setting of a color of the background output to the partial range determined for the object, and
the operations further comprise:
computing, as a feature value of the image area representing the object, a representative point on a color space relating to a color of the image area and a representative value of hue of the image area,
determining a point satisfying a predetermined relation with the representative point on the color space,
determining, based on a color relevant to the determined point, a color of a background of the partial range determined for the object,
determining a color far from a computed representative value by a predetermined angle on a hue circle, and
determining, based on the determined color, a color of a background of the partial range determined for the object.

2. The information processing apparatus according to claim 1, wherein the operations further comprise:
determining the partial range relevant to each of a plurality of the objects detected from the captured image,
determining the output setting relevant to each of a plurality of the objects, and
performing, on the output apparatus, a setting for each of a plurality of the objects.

3. The information processing apparatus according to claim 1, wherein the operations further comprise transforming, by using information representing correspondence between a position on the image capture apparatus and an output position of the output apparatus, a range on the captured image indicated by the image area representing the object to an output range of the output apparatus.

4. A control method executed by a computer, comprising:
detecting an object from a captured image generated by an image capture apparatus;
determining, based on a range occupied by an image area representing the object in the captured image, a partial range relevant to the object, within an output range of an output apparatus that performs an output having influence on an image capture environment;
determining, based on a feature value of the image area representing the detected object, an output setting of the output apparatus for the partial range; and
applying, to the output apparatus, the output setting for the partial range determined for the object, wherein
the output apparatus is an apparatus that outputs a background,
the partial range determined for the object is a range to be a background of and around the object, within a range of a background output by the output apparatus, and
the output setting determined for the object is a setting of a color of the background output to the partial range determined for the object, and
the control method further comprises:
in the determination of the output setting:
computing, as a feature value of the image area representing the object, a representative point on a color space relating to a color of the image area and a representative value of hue of the image area;
determining a point satisfying a predetermined relation with the representative point on the color space;
determining, based on a color relevant to the determined point, a color of a background of the partial range determined for the object
determining a color far from a computed representative value by a predetermined angle on a hue circle; and
determining, based on the determined color, a color of a background of the partial range determined for the object.

5. The control method according to claim 4, further comprising:

in the determination of the partial range, determining the output range relevant to each of a plurality of the objects detected from the captured image;

in the determination of the output setting, determining the output setting relevant to each of a plurality of the objects; and in the applying, performing, on the output apparatus, a setting for each of a plurality of the objects.

6. The control method according to claim 4, further comprising, in the determination of the partial range, transforming, by using information representing correspondence between a position on the image capture apparatus and an output position of the output apparatus, a range on the captured image indicated by the image area representing the object to an output range of the output apparatus.

7. A non-transitory computer readable storage medium storing a program that causes a computer to execute steps included in a control method, the method comprising:

detecting an object from a captured image generated by an image capture apparatus;

determining, based on a range occupied by an image area representing the object in the captured image, a partial range relevant to the object, within an output range of an output apparatus that performs an output having influence on an image capture environment;

determining, based on a feature value of the image area representing the detected object, an output setting of the output apparatus for the partial range; and applying, to the output apparatus, the output setting for the partial range determined for the object, wherein the output apparatus is an apparatus that outputs a background, the partial range determined for the object is a range to be a background of and around the object, within a range of a background output by the output apparatus, and the output setting determined for the object is a setting of a color of the background output to the partial range determined for the object, and the control method further comprises:

in the determination of the output setting:

computing, as a feature value of the image area representing the object, a representative point on a color space relating to a color of the image area and a representative value of hue of the image area;

determining a point satisfying a predetermined relation with the representative point on the color space;

determining, based on a color relevant to the determined point, a color of a background of the partial range determined for the object determining a color far from a computed representative value by a predetermined angle on a hue circle; and determining, based on the determined color, a color of a background of the partial range determined for the object.

* * * * *